(12) United States Patent
Yuzawa

(10) Patent No.: US 7,457,990 B2
(45) Date of Patent: Nov. 25, 2008

(54) INFORMATION PROCESSING APPARATUS AND INFORMATION PROCESSING RECOVERY METHOD

(75) Inventor: Takahiro Yuzawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 480 days.

(21) Appl. No.: 11/377,209

(22) Filed: Mar. 17, 2006

(65) Prior Publication Data

US 2007/0067668 A1   Mar. 22, 2007

(30) Foreign Application Priority Data

Sep. 21, 2005   (JP)   ............................. 2005-274716

(51) Int. Cl.
*G06F 11/00*   (2006.01)
(52) U.S. Cl. ...................................... 714/42
(58) Field of Classification Search ................. 714/42, 714/2, 5–8, 11–13, 15, 16, 20, 31, 47
See application file for complete search history.

(56) References Cited

U.S. PATENT DOCUMENTS

| | | | | |
|---|---|---|---|---|
| 5,864,653 A * | 1/1999 | Tavallaei et al. | ................ | 714/2 |
| 6,175,904 B1 * | 1/2001 | Gunderson | ................... | 711/162 |
| 6,584,014 B2 * | 6/2003 | Hirosawa et al. | ........ | 365/185.09 |
| 6,910,151 B2 * | 6/2005 | Qin et al. | ........................ | 714/6 |
| 7,127,636 B2 * | 10/2006 | Werner et al. | ................... | 714/6 |
| 7,337,353 B2 * | 2/2008 | Yamamoto et al. | ............. | 714/7 |

FOREIGN PATENT DOCUMENTS

| JP | 11-272779 | 10/1999 |
|---|---|---|
| JP | 3085872 | 2/2002 |
| JP | 2002-215399 | 8/2002 |

* cited by examiner

*Primary Examiner*—Nadeem Iqbal
(74) *Attorney, Agent, or Firm*—Staas & Halsey LLP

(57) ABSTRACT

An information processing apparatus having a plurality of systems including software for starting and activating the systems, in which, when one system is active, other systems do not operate, includes a first storage unit that stores the plurality of systems, a second storage unit that stores a system different from the plurality of systems, and a controller. When a fault is detected in one of the systems stored in the first storage unit, the controller inactivates the systems stored in the first storage unit and starts the system stored in the second storage unit. The system stored in the second storage unit diagnoses the detected fault. When the fault is caused by the software as a result of the diagnosis, another system stored in the first storage unit is started. When the fault is caused by hardware, the system stored in the second storage unit is kept active.

14 Claims, 5 Drawing Sheets

S400 WARNING...

S401
RESTART SYSTEM USING CD-ROM

S402
DIAGNOSE HARD DISK

S403
SWITCH REGION

S404
RESTART SYSTEM USING AUXILIARY REGION 202

S410 WARNING...

S411
RESTART SYSTEM USING CD-ROM

S412
DIAGNOSE HARD DISK

S413
SWITCH REGION

S414
RESTART SYSTEM USING AUXILIARY REGION 202

S420 WARNING...

S421
RESTART SYSTEM USING CD-ROM

S422
DIAGNOSE HARD DISK

S423
RESTART SYSTEM USING CD-ROM

INFORMATION PROCESSING APPARATUS AND INFORMATION PROCESSING RECOVERY METHOD

BACKGROUND OF THE INVENTION

1. Field of the Invention

The present invention relates to recovery techniques for information processing apparatuses. More specifically, the present invention relates to a recovery technique for an embedded-system-specific information processing apparatus for, when a fault occurs in a built-in hard disk of the information processing apparatus, allowing the information processing apparatus to appropriately switch over the system to recover from the fault.

2. Description of the Related Art

Typical storage devices of embedded systems include compact disk read only memories (CD-ROMs), flash memories, and hard disk drives (HDDs). In fields that require large-capacity storage devices, large-capacity flash memories have recently been employed in some cases. In most cases, however, due to the expensiveness of the flash memories and other reasons, hard disks have been employed. However, hard disks have serious environmental issues and a high fault rate due to the manner that they are used. In order to address faults in built-in hard disks of information processing apparatuses, it is common to provide a redundant array of hard disks to improve hard-disk reliability. For example, a multiple-hard-disk configuration, such as a dual-hard-disk configuration, is used.

Japanese Patent Application Laid-Open No. 2002-215399 discloses a computer system pertaining to an exemplary information processing apparatus that recovers, when a hard disk fault occurs, from the fault.

The computer system disclosed in this publication includes a plurality of rebootable disk drives including an HDD. When a fault occurs, one of the normally operating disk drives that has the next highest boot priority after the disk drive that has developed the fault is selected to boot up an operating system (OS) stored in the selected disk drive.

Redundant arrays of independent disks (RAID), in particular, RAID-1 or RAID-5, are used for typical redundant-hard-disk systems.

RAID is a technique for managing a collection of hard disks as a single hard disk. RAID is implemented in either software preset in an OS or the like (hereinafter referred to as "software RAID") or dedicated RAID hardware (hereinafter referred to as "hardware RAID"). In software RAID implementations, the RAID overhead on a disk I/O (Input/Output) mechanism is generally considerable. In server systems or the like, therefore, it is common to use a hardware RAID controller or the like that provides various hardware RAID implementations.

In a RAID, a combination of techniques, such as striping, mirroring, parity checking, and error checking and correction (ECC), is used. In striping, data is distributed and written to or read from a plurality of drives. In mirroring, the same data is written to a plurality of drives. Parity checking is a method for detecting data errors, and error checking and correction (ECC) is a technique for detecting and correcting errors.

RAID-1 is a technique in which the same data is written to a plurality of disks using mirroring so that if one of the disks fails, another disk will continue the processing, thereby increasing the fault tolerance. RAID-1 is typically implemented using two hard disks.

In RAID-1, if a hard disk fault occurs, the following problem arises. In RAID-1, when a hard disk fails, the hard disk is logically removed from the system, and a maintenance engineer who is informed of the fault then replaces the failed hard disk. The cost of the engineer and so forth are involved with the replacement of the hard disk.

RAID-5 is a technique in which data and parity information are recorded on a plurality of hard disks to increase the fault tolerance. When data is recorded on a hard disk, parity information generated from the data and the remaining data are distributed and written to a plurality of hard disks using striping. With this technique, if one of the hard disks fails and data is corrupted, the corrupted data is recovered from the remaining data and the parity information. Only one disk is required for the parity, thus achieving more efficient use of disk regions than mirroring.

However, due to the multiple-hard-disk configuration, RAID-5 has a problem of increasing the size and cost of the entire apparatus. Therefore, RAID-5 is not suitable particularly for embedded-system-specific information processing apparatuses.

Accordingly, the RAID techniques and the computer system disclosed in the aforementioned publication experience problems regarding the cost of maintenance engineers, the increased size of the entire apparatus, and so forth.

SUMMARY OF THE INVENTION

In order to overcome the foregoing problems, it is an object of the present invention to provide a system recovery technique for allowing an information processing apparatus to recover from a hard disk fault that results from a software error without the need for maintenance engineers and without increasing the size of the information processing apparatus.

According to an aspect of the present invention, there is provided an information processing apparatus having a plurality of systems including software for starting and activating the systems. The information processing apparatus is configured so that, when one system is active, other systems do not operate. The information processing apparatus includes a first storage unit that stores the plurality of systems, a second storage unit that stores a system different from the plurality of systems, and a controller. When one of the plurality of systems stored in the first storage unit exercises a fault detecting function to detect a fault, the controller inactivates the plurality of systems stored in the first storage unit and starts the system stored in the second storage unit. The system stored in the second storage unit diagnoses the detected fault. When it is determined that the fault is caused by the software as a result of the diagnosis, another system stored in the first storage unit is started. When it is determined that the fault is caused by hardware as a result of the diagnosis, the system stored in the second storage unit is kept active.

This arrangement allows system recovery for the information processing apparatus without the need for maintenance engineers and without increasing the size of the information processing apparatus.

In the above-described information processing apparatus, the first storage unit may be partitioned into sections, and each of the sections may store a system.

This arrangement ensures that a single physical storage unit stores a plurality of systems so that the systems can be normally started, thus achieving efficient system recovery for the information processing apparatus.

When the information processing apparatus is turned on, the information processing apparatus may be started first by the system stored in the second storage unit, and the system stored in the second storage unit may exercise a fault diagnosis function to diagnose the systems stored in the first storage unit to determine whether or not a fault has occurred. When it is determined that no fault has occurred, one of the systems stored in the first storage unit may be started. When it is determined that a fault has occurred, the system stored in the second storage unit may be kept active.

Thus, when the information processing apparatus is not normally shut down due to sudden power failure or the like and is restarted, it is possible to avoid a failure that could result from a system error in the first storage unit which renders the information processing apparatus unbootable. Therefore, the information processing apparatus can reliably be recovered.

According to another aspect of the present invention, there is provided an information processing recovery method for recovering an information processing system including a first storage unit that stores a plurality of systems and a second storage unit that stores a system, the information processing system being configured so that, when one system is active, other systems do not operate. The method includes a fault monitoring step of monitoring the plurality of systems stored in the first storage unit to determine whether or not a fault has occurred, a fault diagnosing step of, when a fault is detected in the fault monitoring step, diagnosing the detected fault by starting the system stored in the second storage unit while inactivating the plurality of systems stored in the first storage unit, and a second system starting step of starting another system stored in the first storage unit when it is determined in the fault diagnosing step that the fault is caused by software, and keeping the system stored in the second storage unit active when it is determined that the fault is caused by hardware.

This arrangement allows a system of an information processing apparatus to be recovered without the need for maintenance engineers and without increasing the size of the information processing apparatus.

According to another aspect of the present invention, there is provided an information processing recovery program for recovering an information processing system. The program causes a computer to execute a step of monitoring a first storage unit to determine whether or not a fault has occurred, when a fault is detected in the first storage unit, a step of inactivating a currently active system and starting a system stored in a second storage unit to diagnose the detected fault, and a step of starting another system stored in the first storage unit when it is determined that the fault is caused by software, and keeping the system stored in the second storage unit active when it is determined that the fault is caused by hardware.

This arrangement allows a system of an information processing apparatus to be recovered without the need for maintenance engineers and without increasing the size of the information processing apparatus.

An information processing apparatus according to the present invention allows system recovery from a hard disk fault that results from a software error without the need for maintenance engineers and without increasing the size of the information processing apparatus.

Specifically, faults resulting from software errors are faults, except for those that make hard disks unusable, including a bad sector, an uncorrectable data error, a media-specific error, and a file system error.

After the information processing apparatus is turned on, the information processing apparatus is started first by a system stored on a recording medium, such as a CD-ROM. Thus, when the information processing apparatus is not normally shut down due to sudden power failure or the like and is restarted, it is possible to avoid a failure that could result from a hard disk error which renders the information processing apparatus unbootable, and the information processing apparatus can reliably be recovered.

DESCRIPTION OF THE PREFERRED EMBODIMENTS

Figure 1:
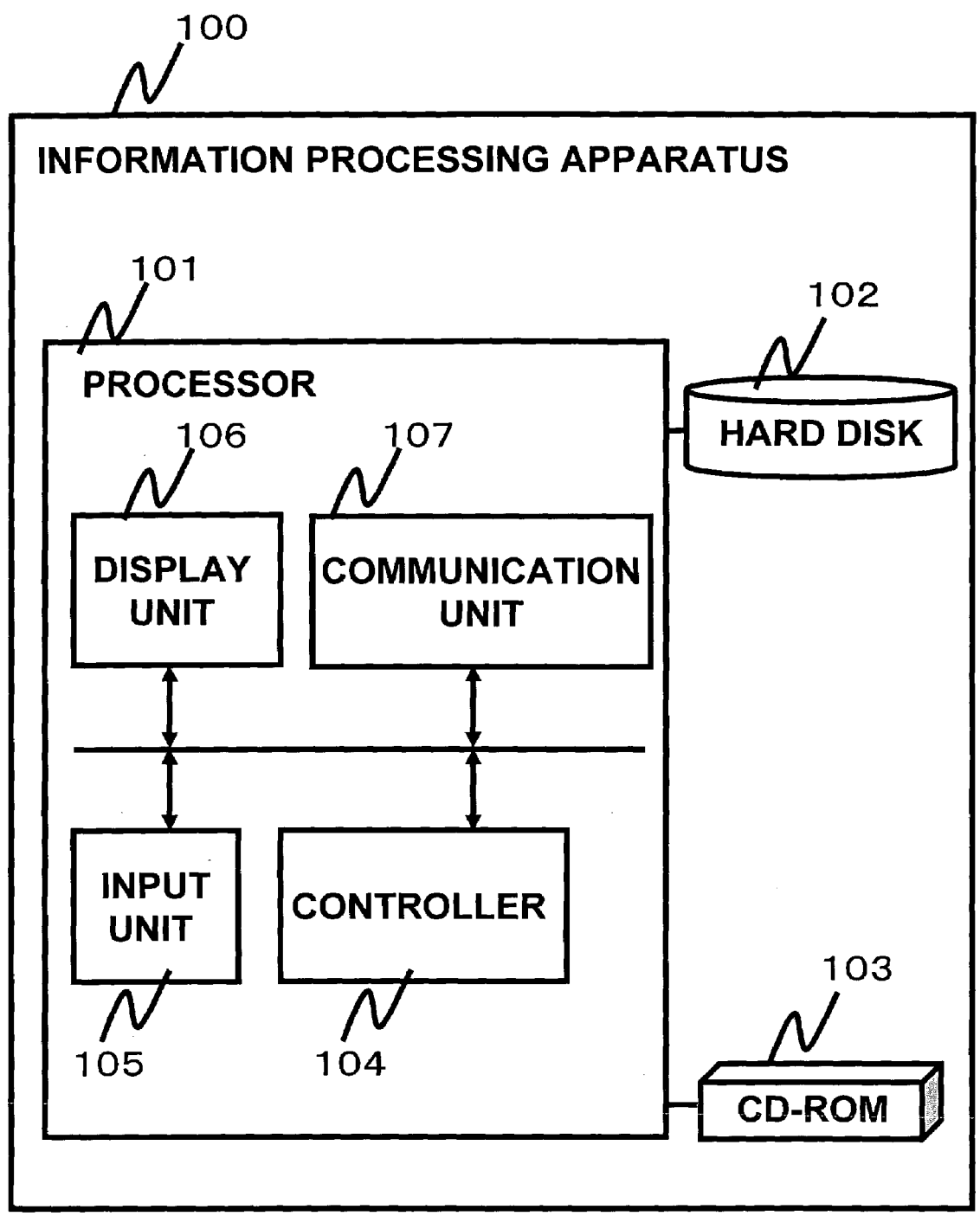
FIG. 1 is a block diagram of an information processing apparatus according to the present invention.

FIG. 1 is a block diagram of an information processing apparatus 100 according to an embodiment of the present invention.

The information processing apparatus 100 includes, for example, a processor 101, a hard disk 102, and a CD-ROM drive 103. The CD-ROM drive 103 reads information recorded on a CD-ROM. In the following description, the CD-ROM drive 103 and a CD-ROM, which is a recording medium, are collectively referred to as a "CD-ROM". In this embodiment, the hard disk 102 and the CD-ROM 103 are illustrated outside the processor 101 to discriminate the hard disk 102 and the CD-ROM 103 from the other processing components in the information processing apparatus 100. In this embodiment, the processor 101 includes a controller 104, an input unit 105, a display unit 106, and a communication unit 107. Although not shown in FIG. 1, the processor 101 further includes a random-access memory (RAM) and a ROM.

The controller 104 includes, for example, a central processing unit (CPU) and a cache memory, and executes a predetermined program or the like stored in the hard disk 102 to perform predetermined information processing.

The input unit 105 includes, for example, a keyboard and a mouse, and is operated to input information.

The display unit 106 is constructed of, for example, a liquid crystal display (LCD) or the like. The information input from the input unit 105 or an information result obtained by the controller 104, such as a hard disk error report or a hard disk diagnostic report, described below, is displayed on the display unit 106.

The communication unit 107 is connected to, for example, a mail server, and is controlled by the controller 104 to transmit or receive e-mail and other information to or from the mail server.

This embodiment will be discussed in the context of an information processing apparatus including an embedded system. The embedded system is a computer system embedded in industrial equipment or a home electric appliance for implementing a specific function. Generally, unlike general-purpose computer systems, such as personal computers (PCs), embedded systems have specific function and performance requirements, and are characterized by constraints with stringent cost restrictions and limited available resources. With the recent advancement and complexity of electronic equipment and cost-effectiveness of microprocessors and memories, embedded systems have been used in a broader range of applications. Embedded systems are used in various electronic appliances, such as washing machines, rice cookers, televisions, video recorders, digital cameras, printers, copying machines, cellular telephones, car navigation systems, automatic vending machines, and ticket vending machines.

As discussed above, the information processing apparatus 100 including an embedded system is a computer system for implementing a specific function, and the hard disk 102 is pre-installed with an OS, an application program (hereinafter referred to simply as an "application"), and so forth, and no new additional applications are generally installed.

The information processing apparatus 100 records logs, such as usage records and data communication records, including the time and date at which the information processing apparatus 100 is operated, the time and date at which data is transmitted or received, the details of the operation, and the transmitted or received data. However, unlike hard disks of personal computers, the information processing apparatus 100 does not update the personal information and the like at any time.

Thus, the hard disk capacity required for the embedded system is not large. The single hard disk 102 is partitioned into a plurality of sections as if a plurality of virtual hard disks exist so that an OS, an application, and so forth can be installed in each of the sections of the hard disk 102 having the physical partition structure.

In this embodiment, the hard disk 102 is partitioned into four regions. Three systems are stored in the respective regions, and the remaining region stores the logs. The term system means a group of programs constructed of an OS and the like. An information processing recovery program according to the present invention constitutes the system, and is stored in each of the hard disk 102 and the CD-ROM 103.

Figure 2:
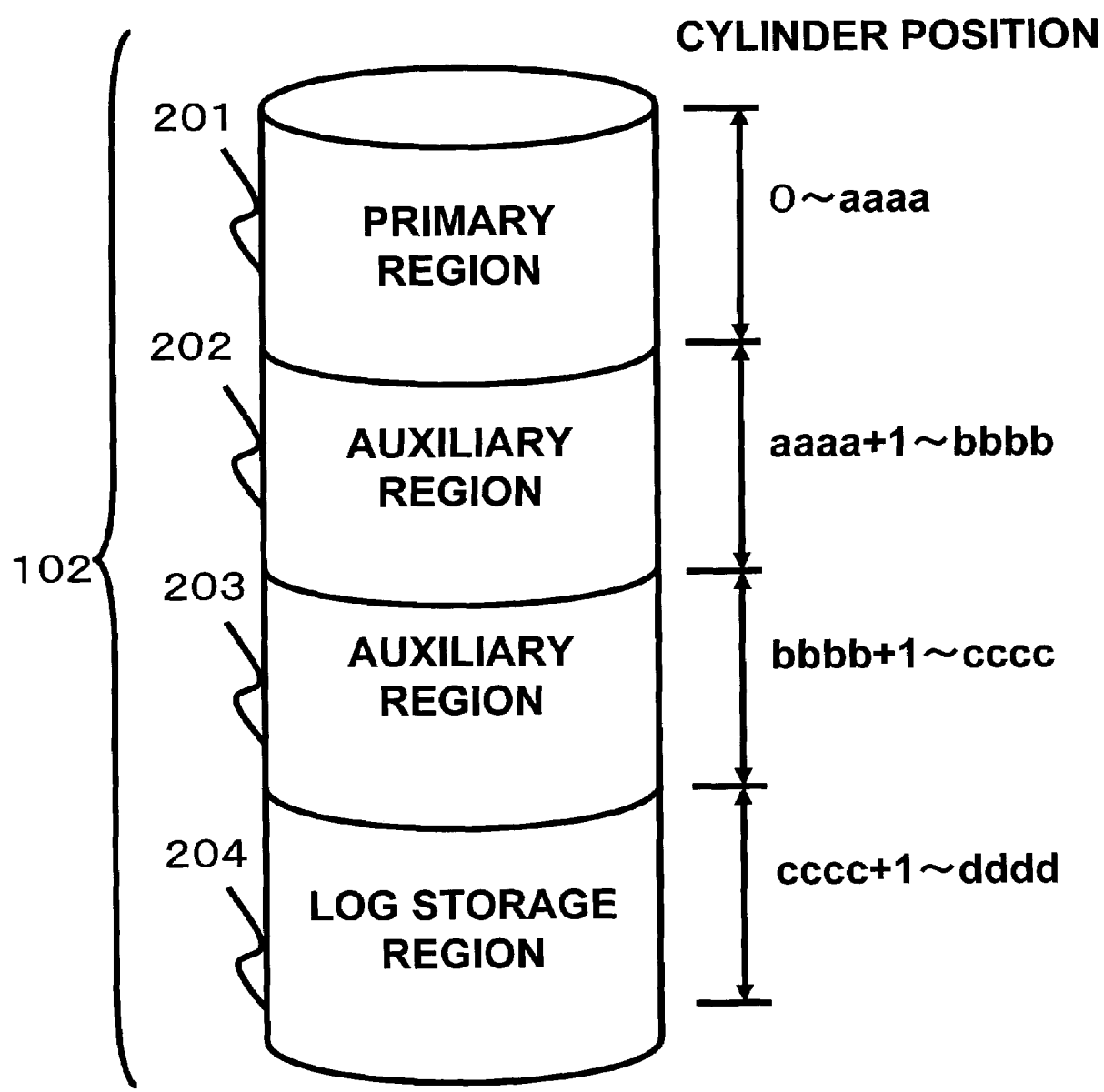
FIG. 2 is a partition configuration diagram of a hard disk according to the present invention.

FIG. 2 is a configuration diagram of the hard disk 102 that is physically partitioned.

In this embodiment, the hard disk 102 is partitioned into four regions corresponding to a primary region 201, auxiliary regions 202 and 203, and a log storage region 204. As a format, as shown in FIG. 2, the primary region 201 spans from cylinder position 0 to cylinder position aaaa, the auxiliary region 202 spans from cylinder position aaaa+1 to cylinder position bbbb, the auxiliary region 203 spans from cylinder position bbbb+1 to cylinder position cccc, and the log storage region 204 spans from cylinder position cccc+1 to cylinder position dddd. The cylinder position dddd may or may not be the last cylinder position. The first cylinder position of the primary region 201 may not be zero. FIG. 2 schematically illustrates four regions into which the hard disk 102 is partitioned at the cylinder positions described above.

The order of the four regions with respect to the cylinder positions may be different from that stated above, and the log storage region 204 may not be the last. For example, the cylinder positions of the primary region 201, the log storage region 204, the auxiliary region 202, and the auxiliary region 203 may be located in the order stated herein.

The cylinder is a unit of storage on a hard disk. A hard disk is typically configured such that a plurality of disks are spaced at even intervals and a number of tracks with the same radius corresponding to the number of disks are arranged into a cylinder. A collection of the cylindrical tracks is referred to as a "cylinder".

The hard disk 102 has a pseudo-multi-disk configuration in which a plurality of systems are individually installed in the primary region 201 and the auxiliary regions 202 and 203 having different physical positions. The systems installed in the primary region 201 and the auxiliary regions 202 and 203 may or may not be completely the same, and, for example, have at least a common OS, which is the basic unit of the systems. In this embodiment, the same OS and application are installed in each of the primary region 201 and the auxiliary regions 202 and 203.

When the hard disk 102 does not fail, the information processing apparatus 100 is started by means of the system installed in the primary region 201. Only the OS installed in the primary region 201 is recognized, and the systems installed in the other regions are recognized as unused spaces.

After starting the system, a monitoring application for monitoring hard disk error messages sent from the OS is resident to monitor the status of the hard disk 102. The monitoring application monitors whether or not a problem has occurred in the hard disk 102. More specifically, the monitoring application checks the hard disk accessibility, the occurrence of file errors, and the occurrence of data corruption.

In the information processing apparatus 100, when the monitoring application detects a problem with the hard disk 102, the system is restarted from the CD-ROM 103, and the hard disk 102 is logically removed. By "the hard disk 102 is logically removed", it is meant that although the hard disk 102 is still physically connected to the processor 101 via an interface, the access from the processor 101 to the hard disk 102 and the access from the hard disk 102 to the processor 101 are prohibited.

The CD-ROM 103 stores a system equivalent to the system constructed of the OS and so forth that is installed in each of the partitioned regions of the hard disk 102, i.e., the primary region 201 and the auxiliary regions 202 and 203, so that the information processing apparatus 100 can be managed by the CD-ROM 103. The system stored on the CD-ROM 103 may not be completely the same as the system stored on the hard disk 102.

CD-ROMs are more robust than hard disks to abnormalities of media or data corruption resulting from data refreshing or use. In this embodiment, therefore, a CD-ROM is used to restart the system when a hard disk problem is detected. Any recording medium having such features, other than a CD-ROM, may record an OS and so forth, and may be used for restart when a hard disk problem is detected.

For example, an application for monitoring the status of the hard disk 102 may not be stored in the CD-ROM 103. Instead, a diagnostic application, described below, which is operated by the CD-ROM 103 to diagnose the hard disk 102, may be stored in the CD-ROM 103. The monitoring application may be stored in the CD-ROM 103.

After a hard disk fault occurs and the system is restarted from the CD-ROM 103, the diagnostic application stored on the CD-ROM 103 diagnoses the primary region 201 of the hard disk 102.

As a result of the diagnosis of the primary region 201 using the diagnostic application, if it is determined that the primary region 201 of the hard disk 102 has a problem, the partition information of the hard disk 102 is changed from the primary region 201 to the auxiliary region 202 to switch to the system stored in the auxiliary region 202.

After switching to the system stored in the auxiliary region 202, the diagnostic application stored on the CD-ROM 103 further performs the hard disk diagnoses on the auxiliary region 202. As a result of the hard disk diagnosis, if the auxiliary region 202 has no hardware problem, it is determined that the hard disk fault results from a software error in the primary region 201, rather than a hardware error, and the information processing apparatus 100 is restarted by means of the system stored in the auxiliary region 202 to recover the information processing apparatus 100.

When the hard disk 102 fails, the user of the information processing apparatus 100 uses the display unit 106 to recognize the problem detected by the monitoring application, and uses the input unit 105 to input information to appropriately address the failed hard disk 102.

Records of the operation of the information processing apparatus 100 and the operation details are stored in the log storage region 204.

Figure 3:
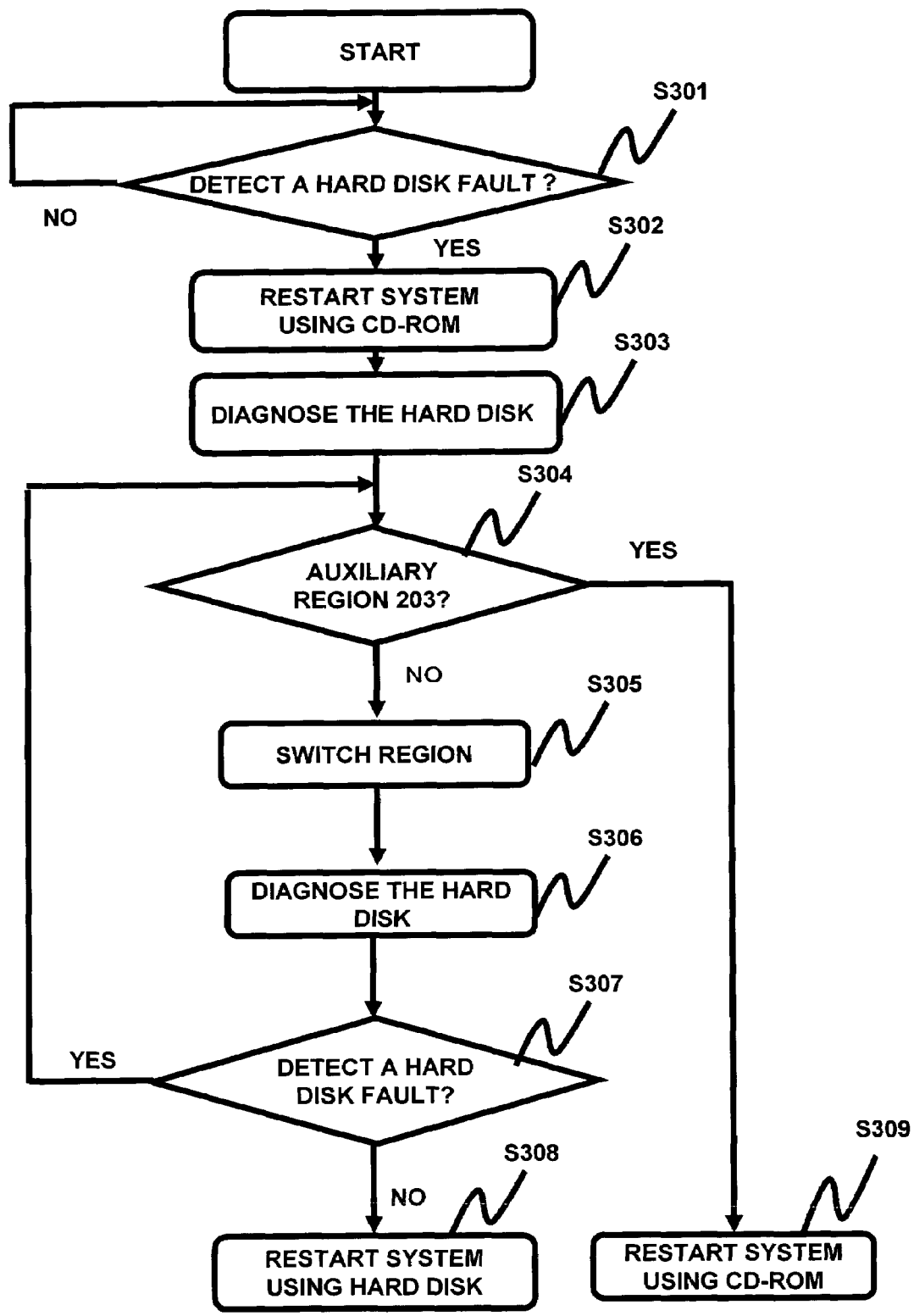
FIG. 3 is a flowchart showing a process for switching partitioned sections according to the present invention.

FIG. 3 is a flowchart showing a partition switching process according to the present invention. This process is performed when a problem occurs in the currently active hard disk region (i.e., the primary region 201 or the auxiliary region 202 or 203).

First, in the information processing apparatus 100, when the monitoring application monitors the hard disk 102 and detects a hard disk fault (step S301), the system is restarted using the CD-ROM 103 (step S302), and the hard disk 102 is logically removed.

After restarting the system by using the CD-ROM 103, the diagnostic application stored on the CD-ROM 103 diagnoses the hard disk 102 (step S303). When a fault is detected as a result of the diagnosis, the monitoring application examines the detected fault in detail.

In the information processing apparatus 100, when the monitoring application detects a fault with the hard disk 102, the controller 104 determines whether or not the detected fault has occurred in the auxiliary region 203 (step S304). The monitoring application checks the hard disk accessibility, the occurrence of file errors, and the occurrence of data corruption. The controller 104 may determine which region of the primary region 201 and the auxiliary regions 202 and 203 the monitoring application that has detected the fault is installed in, thereby determining whether or not the fault of the hard disk 102 has occurred in the auxiliary region 203. Alternatively, the controller 104 may determine which region of the hard disk 102 has been diagnosed by the diagnostic application of the CD-ROM 103, thereby determining which region the hard disk fault has occurred in. The order of the priorities assigned to the regions may not be that stated above, and other priority order may be used. For example, if a hard disk fault has occurred in the primary region 201, the active region may be changed to the auxiliary region 203, or, if a hard disk fault has occurred in the auxiliary region 202, the active region may be changed to the primary region 201.

If the detected hard disk fault has occurred in the auxiliary region 203, the system stored on the CD-ROM 103 is used to recover the system of the information processing apparatus 100 (step S309).

If the detected hard disk fault has not occurred in the auxiliary region 203, the fault may have occurred in any other region, and the active region is switched from the region in which the fault has occurred to the region having the next highest priority (step S305). If the hard disk fault has occurred in the primary region 201, the active region is changed to the auxiliary region 202 that is assigned the next highest priority. If the hard disk fault has occurred in the auxiliary region 202, the active region is changed to the auxiliary region 203 that is assigned the next highest priority.

After switching the active partitioned region, the information processing apparatus 100 diagnoses the switched partitioned region using the diagnostic application stored on the CD-ROM 103 (step S306).

As a result of the diagnosis, the diagnostic application determines whether or not the switched partitioned region has a hard disk problem (step S307). If there is no problem, it is determined that the hard disk fault detected before switching the active partitioned region results from a software error in the partitioned region before switching the active partitioned region, rather than a hardware error, and the information processing apparatus 100 is restarted using the system stored in the switched partitioned region to recover the system of the information processing apparatus 100 (step S308). If it is determined in step S307 that the switched partitioned region has a problem, the process returns to step S304, and the controller 104 determines whether or not the partitioned region having the problem is the auxiliary region 203.

Figure 4A:
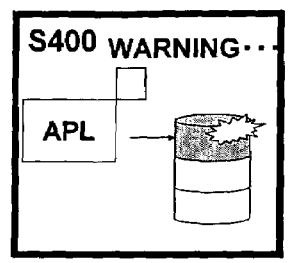
FIGS. 4A to 4C are charts showing how the information processing apparatus recovers from a hard disk fault according to the present invention.
Figure 4A:
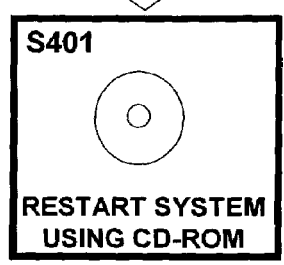
Figure 4A:
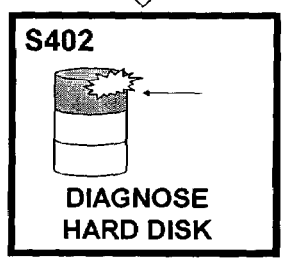
Figure 4A:
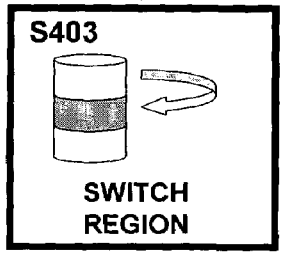
Figure 4A:
Figure 4B:
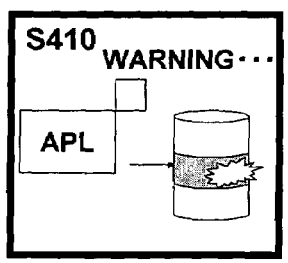
Figure 4B:
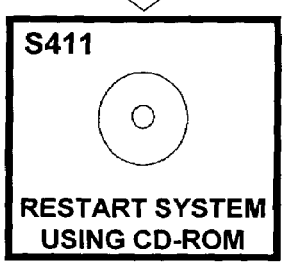
Figure 4B:
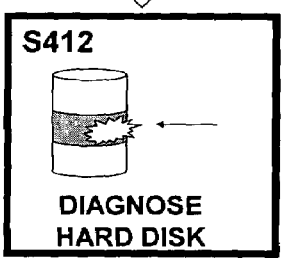
Figure 4B:
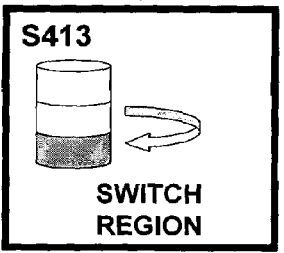
Figure 4B:
Figure 4C:
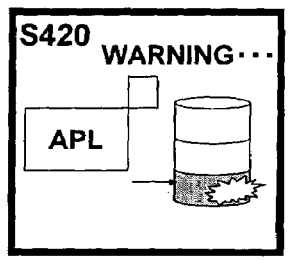
Figure 4C:
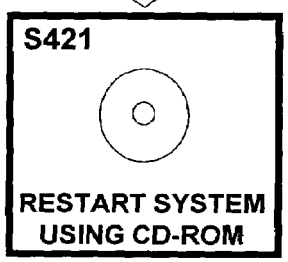
Figure 4C:
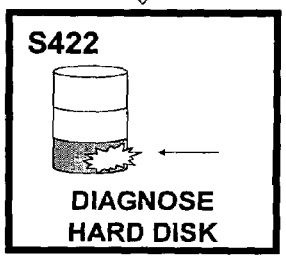
Figure 4C:
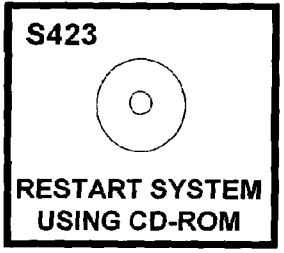

FIGS. 4A to 4C are charts showing operations of the information processing apparatus 100 to recover from a hard disk fault according to the present invention.

First, a case where the information processing apparatus 100 is started by means of the system installed in the primary region 201 will be described with reference to FIG. 4A.

A monitoring application for monitoring hard disk error messages sent from the OS resides in an internal application installed in the primary region 201, and monitors the hard disk status (step S400).

In the information processing apparatus 100, if the monitoring application detects a hard disk fault, the system is restarted using the CD-ROM 103, and the hard disk 102 is logically removed (step S401).

The diagnostic application stored on the CD-ROM 103 diagnoses the primary region 201 (step S402).

As a result of the diagnosis of the hard disk 102 using the diagnostic application, if the primary region 201 has a problem, the partition information of the hard disk 102 is modified to switch to the system stored in the auxiliary region 202 (step S403).

After switching to the system in the auxiliary region 202, the diagnostic application stored on the CD-ROM 103 further performs the hard disk diagnosis on the auxiliary region 202. As a result of the hard disk diagnosis, if the auxiliary region 202 has no hard disk problem, it is determined that the detected hard disk fault results from a software error in the primary region 201, rather than a hardware error, and the information processing apparatus 100 is restarted using the system in the auxiliary region 202 to recover the system of the information processing apparatus 100 (step S404).

Next, a case where the information processing apparatus 100 is started by means of the system installed in the auxiliary region 202 will be described with reference to FIG. 4B.

The monitoring application installed in the auxiliary region 202 monitors hard disk error messages sent from the OS (step S410).

In the information processing apparatus 100, if the monitoring application detects a hard disk fault, the system is restarted using the CD-ROM 103, and the hard disk 102 is logically removed (step S411).

The diagnostic application stored on the CD-ROM 103 diagnoses the auxiliary region 202 (step S412).

As a result of the diagnosis of the hard disk 102 using the diagnostic application, if the auxiliary region 202 has a problem, the partition information of the hard disk 102 is modified to switch to the system stored in the auxiliary region 203 (step S413).

After switching to the system in the auxiliary region 203, the diagnostic application stored on the CD-ROM 103 further performs the hard disk diagnosis on the auxiliary region 203. As a result of the hard disk diagnosis, if the auxiliary region 203 has no hard disk problem, it is determined that the detected hard disk fault results from a software error in the auxiliary region 202, rather than a hardware error, and the system in the auxiliary region 203 is used to recover the system of the information processing apparatus 100 (step S414).

Next, a case where the information processing apparatus 100 is started by means of the system installed in the auxiliary region 203 will be described with reference to FIG. 4C.

The monitoring application installed in the auxiliary region 203 monitors hard disk error messages sent from the OS (step S420).

In the information processing apparatus 100, if the monitoring application detects a hard disk fault, the system is restarted using the CD-ROM 103, and the hard disk 102 is logically removed (step S421).

The diagnostic application stored on the CD-ROM 103 diagnoses the auxiliary region 203 (step S422).

As a result of the diagnosis of the hard disk 102 using the diagnostic application, if the auxiliary region 203 has a problem, the CD-ROM 103 is booted to recover the system of the information processing apparatus 100 (step S423).

Figure 5:
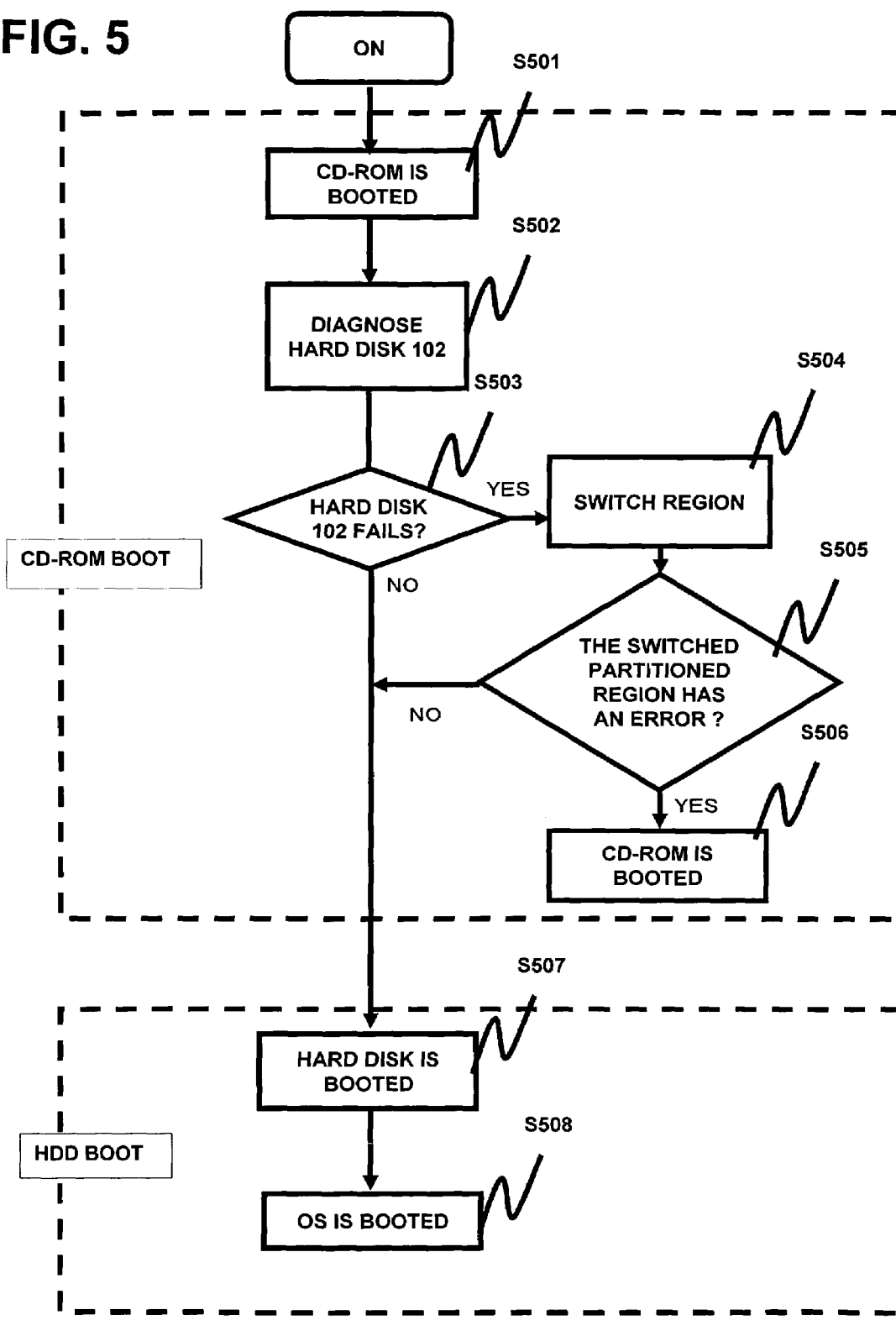
FIG. 5 is a flowchart showing a process for starting the information processing apparatus according to the present invention.

FIG. 5 is a flowchart showing a process for starting the information processing apparatus 100 according to the present invention.

First, when the user turns on the information processing apparatus 100 using, for example, the input unit 105, the CD-ROM 103 is booted to start the system stored on the CD-ROM 103 (step S501).

Then, the diagnostic application stored on the CD-ROM 103 diagnoses the hard disk 102 at any time (step S502).

According to the diagnostic processing of step S502, it is determined whether or not the hard disk 102 fails (step S503). If it is determined that a hard disk fault has occurred, the active partitioned region is switched from the partitioned region in which the fault has occurred to another partitioned region (step S504).

After switching the active partitioned region, the diagnostic application stored on the CD-ROM 102 determines whether or not the switched partitioned region has an error (step S505). If the diagnostic application determines that there is an error, the CD-ROM 103 is used to boot the OS (step S506). In the event of switching the active partitioned regions, the diagnostic application may sequentially diagnose the primary region 201, the auxiliary region 202, and the auxiliary region 203 in the order stated herein to determine whether or not the fault has occurred, and if it is determined that the fault has also occurred in the auxiliary region 203, the OS may be booted from the CD-ROM 103.

If it is determined in step S503 that no hard disk fault has occurred, the system stored in the hard disk 102 is booted (step S507), and the OS is then booted (step S508).

In the present invention, by partitioning the hard disk into regions, the size of the cluster, which is the minimum unit for a read or write operation, can also be reduced, and the efficiency of the hard disk can therefore increase.

The following modifications of or other technically extended embodiments from the embodiment described above may also fall within the scope of the present invention:

(1) While the above-described embodiment has been discussed in the context of an information processing apparatus implemented as an embedded system, the present invention is not limited thereto, and an information processing apparatus other than an embedded system may also fall within the scope of the invention.

(2) While the above-described embodiment has been discussed in the context of recovery from hard disk faults, the present invention is not limited thereto, and recovery from faults of other recording media, such as a RAM, may also fall within the scope of the invention. The recording media may include removable recording media, and memories that do not erase the data stored therein when the power supply is turned off, such as a flash memory.

(3) While the hard disk 102 is partitioned into four regions in the above-described embodiment, the present invention is not limited thereto. The hard disk 102 may be partitioned into more regions or two or three regions.

(4) While the information processing apparatus 100 according to the above-described embodiment is provided with the communication unit 107, the present invention is not limited thereto, and an information processing apparatus without a communication function may also fall within the scope of the invention. Likewise, an information processing apparatus without a display unit or an input unit may also fall within the scope of the invention.

The technical features of the information processing apparatus according to the above-described embodiments and modifications are set forth in the appended claims. The technical features of the present invention can be represented in different levels and variations from the higher-level concept to the lower-level concept without departing from the scope of the present invention.

What is claimed is:

1. An information processing apparatus having a plurality of systems including software for starting and activating the systems, the information processing apparatus being configured so that, when one system is active, other systems do not operate, the information processing apparatus comprising:
    a first storage unit storing the plurality of systems;
    a second storage unit storing a system different from the plurality of systems; and
    a controller inactivating the plurality of systems stored in the first storage unit and starting the system stored in the second storage unit when one of the plurality of systems stored in the first storage unit exercises a fault detecting function to detect a fault,
    wherein the system stored in the second storage unit diagnoses the detected fault,
    when it is determined that the fault is caused by the software as a result of the diagnosis, another system stored in the first storage unit is started, and
    when it is determined that the fault is caused by hardware as a result of the diagnosis, the system stored in the second storage unit is kept active.

2. The information processing apparatus according to claim 1, wherein the first storage unit comprises a hard disk.

3. The information processing apparatus according to claim 1, wherein the first storage unit is partitioned into sections, and each of the sections stores a system.

4. The information processing apparatus according to claim 1, wherein the second storage unit comprises a CD-ROM.

5. The information processing apparatus according to claim 1, wherein when the information processing apparatus is turned on, the information processing apparatus is started first by the system stored in the second storage unit, and the system stored in the second storage unit exercises a fault diagnosing function to diagnose the systems stored in the first storage unit to determine whether or not a fault has occurred,
    when it is determined that no fault has occurred, one of the systems stored in the first storage unit is started, and
    when it is determined that a fault has occurred, the system stored in the second storage unit is kept active.

6. The information processing apparatus according to claim 1, wherein each of the systems stored in the first storage unit and the system stored in the second storage unit comprises an embedded system.

7. An information processing recovery method for recovering an information processing system, executed by programmed processor, comprising the steps of:

monitoring first storage unit to determine whether or not a fault has occurred;

inactivating a currently active system and starting a system stored in second storage unit to diagnose the detected fault when a fault is detected in the first storage unit; and starting another system stored in the first storage unit when it is determined that the fault is caused by software, and keeping the system stored in the second storage unit active when it is determined that the fault is caused by hardware.

8. The information processing recovery method according to claim 7, wherein when the computer is turned on, the computer is started first by the system stored in the second storage unit, and the system stored in the second storage unit exercises a fault diagnosing function to diagnose the systems stored in the first storage unit to determine whether or not a fault has occurred, when it is determined that no fault has occurred, one of the systems stored in the first storage unit is started, and when it is determined that a fault has occurred, the system stored in the second storage unit is kept active.

9. An information processing apparatus comprising:

a storage unit being divided into a plurality of regions for storing an operation system in each of at least two or more of the plurality of regions;

a reading unit reading information from a recording medium storing at least an operation system; and a controller determining whether or not a fault has occurred in any of the plurality of regions and, when it is determined that a fault has occurred in a given region of the storage unit, switching the given region to a different region of the storage unit to perform restart using the operation system stored in the different region.

10. The information processing apparatus according to claim 9, wherein, when a fault has occurred in the storage unit, the controller performs restart using the operation system stored in the recording medium, and examines the fault of the storage means after performing the restart.

11. The information processing apparatus according to claim 9, wherein the recording medium comprises a portable medium.

12. A method for recovering an information processing apparatus including first storage unit having a plurality of regions, each of at least two of the plurality of regions storing a system including an operation system, the method executed by programmed processor, comprising the steps of:

monitoring the first storage unit having the plurality of regions to determine whether or not a fault has occurred;

stopping a currently active system when a fault is detected in any region of the first storage unit; and restarting the information processing apparatus using an operation system stored in a region different from the region in which the fault is detected.

13. The method according to claim 12, further comprising the steps of:

starting the information processing apparatus using an operating system stored in a different region of the first storage unit from the region in which the fault is detected, when the fault is caused by software, and restarting the information processing apparatus using an operation system stored in second storage unit; and diagnosing the first storage unit.

14. The method according to claim 13, further comprising a step of:

restarting the information processing apparatus using an operation system stored in a different region of the first storage unit from the region in which the fault is detected, when it is determined in the step of diagnosing the first storage unit that the fault of the first storage unit is caused by software.

* * * * *